United States Patent [19]
Kunimoto

[11] Patent Number: 5,198,646
[45] Date of Patent: Mar. 30, 1993

[54] SYSTEM FOR DETECTING PUNCHED HOLES OF MAGNETIC CARDS

[75] Inventor: Yukitaka Kunimoto, Tokyo, Japan
[73] Assignee: Kabushiki Kaisha CSK, Tokyo, Japan
[21] Appl. No.: 778,816
[22] PCT Filed: Apr. 19, 1991
[86] PCT No.: PCT/JP91/00524
§ 371 Date: Dec. 18, 1991
§ 102(e) Date: Dec. 18, 1991

[30] Foreign Application Priority Data
Apr. 19, 1990 [JP] Japan .................. 2-104202

[51] Int. Cl.$^5$ .............................................. G06K 5/00
[52] U.S. Cl. ................................... 235/449; 235/454; 235/487
[58] Field of Search .................. 235/449, 454, 487

[56] References Cited
U.S. PATENT DOCUMENTS
4,211,918 7/1980 Nyekler ........................ 235/454

FOREIGN PATENT DOCUMENTS
55-116179 9/1980 Japan .
56-90386 7/1981 Japan .
60-254371 12/1985 Japan .
63-18490 1/1988 Japan .

Primary Examiner—Harold Pitts
Attorney, Agent, or Firm—Lackenbach Siegel Marzullo & Aronson

[57] ABSTRACT

The present invention comprises a magnetic card 1 in which punched holes 5 are punched to indicate incidence of use data and a punched hole detection apparatus 4 for detecting the punched holes 5 of the magnetic card 1. The magnetic card 1 has a hole punch section 3 in the shape of a strip. The punched hole section 3 has a plurality of small segments 31 in a row which are arranged parallel to the length of the card, and two kinds of ink having different optical characteristics are applied to the small segments 31 according to prescribed rules. The punched hole detection apparatus 4 comprises a light source for shooting rays of light used to distinguish the two kinds of ink onto the punched hole section 3; a light-receiving section for receiving rays of light reflected by the hole punch section 3 of the magnetic card 1 and for outputting a light reception signal; a pattern storage section 45 for storing predefined signal patterns for normal magnetic cards 1; and a comparison section 44 for comparing the light reception signal from the light-receiving section with normal signal patterns stored by the pattern storage section 45.

5 Claims, 2 Drawing Sheets

SYSTEM FOR DETECTING PUNCHED HOLES OF MAGNETIC CARDS

TECHNICAL FIELD

The present invention relates to a system for detecting punched holes of magnetic cards in which holes are punched to indicate incidence of use or the like for the purpose of preventing data from being forged and falsified.

BACKGROUND ART

When a magnetic card is used, holes are punched therein as a means for providing simple visual information to indicate such things as the number of remaining units or the amount of money or the like remaining in prepaid cards, such as telephone cards. These punched holes are used as a means for preventing magnetic cards from being forged. By applying the method of the prior art, the positions of punched holes are checked by optical or magnetic means. Whether forgery or falsification has been made is confirmed by comparing the positions with the contents of the data.

However, in the method of the prior art in which the positions of punched holes are detected optically, detection becomes impossible by merely filling up the punched holes. When detection is performed by a magnetic means, forgery or the like cannot be completely prevented since detection becomes impossible when punched holes are filled up with a material having the same magnetic properties as those of the magnetic cards, for example, scraps produced by punching holes.

The present invention has been accomplished to solve the above-mentioned problems of the prior art.

An object of the present invention is to provide a system for detecting punched holes of magnetic cards, which is capable of detecting the punched holes even if these holes are filled up by the same material as that of the magnetic cards so that the forgery of the magnetic card can be reliably prevented.

DISCLOSURE OF THE INVENTION

In order to achieve the above-mentioned objects, according to one aspect of the present invention, there are provided magnetic cards for magnetically recording data, in which holes are punched to indicate incidence of use data, and a punched hole detection apparatus for detecting punched holes in the magnetic card. The magnetic card has a hole punch section in the shape of a strip. The punched hole section has a plurality of small segments in a row which are arranged parallel to the length of the card, and two kinds of inks having different optical characteristics are applied to the small segments according to prescribed rules. The punched hole detection apparatus comprises a light source for shooting rays of light used to distinguish the two kinds of ink onto the punched hole section; a light-receiving section for receiving rays of light reflected by the hole punch section of the magnetic card and for outputting a light reception signal; a pattern storage section for storing predefined signal patterns for normal magnetic cards; and a comparison section for comparing the light reception signal from the light-receiving section with normal signal patterns stored by the pattern storage section. As a result, the present invention has an advantage in that it can prevent magnetic cards from being forged and falsified even if punched holes are filled up with the same material as that of a magnetic card, as it is possible to detect the punched holes and the fact that they are filled up by checking the optical characteristics of the small segments.

BRIEF DESCRIPTION OF THE DRAWINGS

FIG. 3(a) is a view which illustrates a condition in which there are no punched holes;

FIG. 3(b) is a view which illustrates a condition in which holes are punched; and FIG. 3(c) is a view which illustrates a condition in which punched holes are filled up by foreign matter.

THE BEST MODE FOR CARRYING OUT THE INVENTION

An embodiment of the present invention will be explained below with reference to the accompanying drawings.

Figure 1:
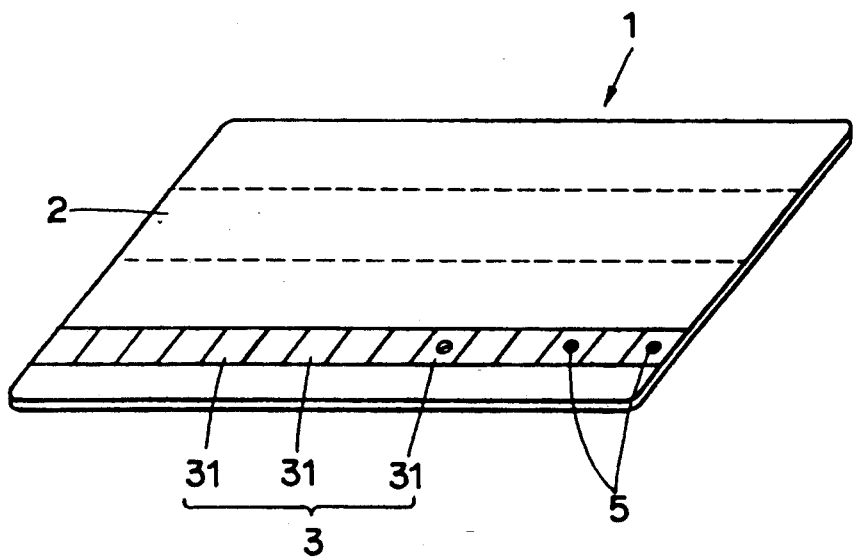
FIG. 1 is a perspective view which illustrates a magnetic card according to an embodiment of the present invention.

FIG. 1 is a perspective view which illustrates a magnetic card in accordance with an embodiment of the present invention.

As shown, in a magnetic card 1 of this embodiment, a magnetic recording section 2 in the shape of a strip for magnetically recording data is provided parallelly to the length of the magnetic card 1, and a hole punch section 3 in the shape of a strip, in which holes are punched to indicate incidence of use or the like, is provided parallelly to the magnetic recording area 2.

The hole punch section 3 is segmented into a plurality of small segments 31 along the longitudinal direction thereof. These small segments 31 are provided in correspondence with the positions of the punched holes 5. Therefore, as shown, it follows that the holes 5 are punched within the small segments 31.

Two kinds of ink whose reflectances are the same in light-visible regions and different for ultra-red rays are applied on the surface of the small segments 31. As a consequence, although the small segments 31 cannot be distinguished by the naked eye under normal conditions, the segments can be distinguished as two kinds by shooting ultra-red rays onto the hole punch section 3 and by comparing the reflectances.

Figure 2:
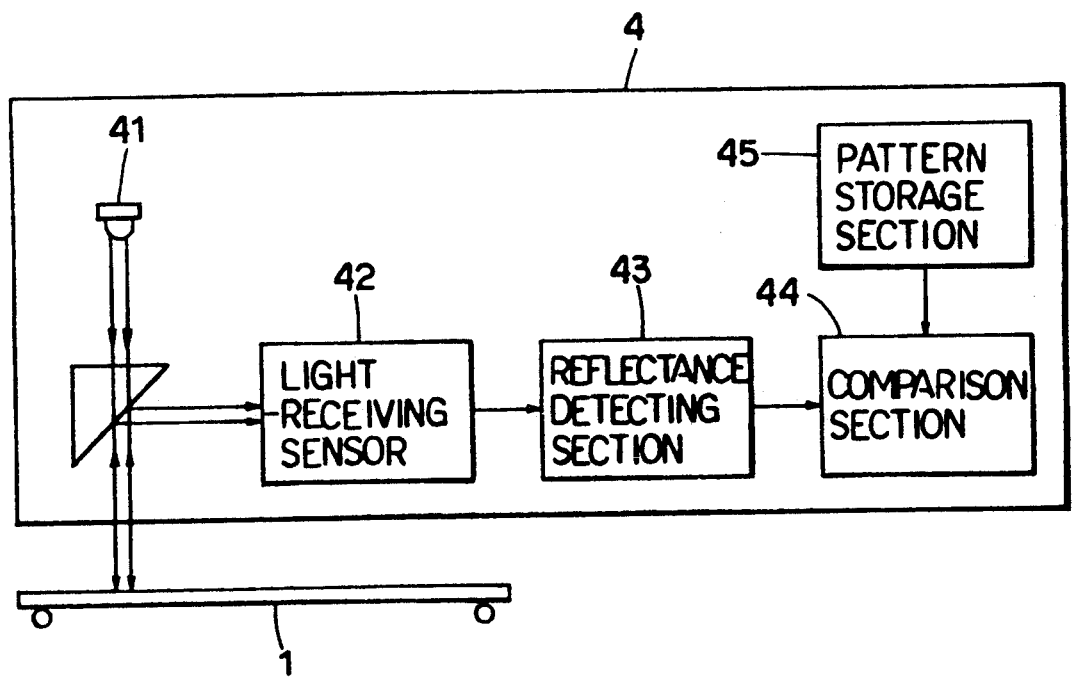
FIG. 2 is a schematic view which illustrates the construction of an apparatus for detecting punched holes of the magnetic card of FIG. 1.

FIG. 2 schematically shows the construction of an apparatus for detecting punched holes of the above-described magnetic card 1.

A punched hole detection apparatus 4 comprises an LED 41 employed as a light source for shooting rays of light onto the hole punch section 3; a light-receiving sensor 42 employed as a light-receiving section for receiving ultra-red rays reflected by the hole punch section 3; a reflectance detecting section 43 for detecting the reflectance of ultra-red rays from the hole punch section 3 on the basis of the light reception signal of the light-receiving sensor 42; a comparison section 44 for comparing the detected signal of the reflectance detecting section 43 with a predefined, normal, stored signal pattern; and a pattern storage section 45 for storing the normal signal pattern.

The above-described normal signal pattern is one which should be detected by reflectance from the hole punch section 3 of the normal magnetic card 1, which has not been forged. A signal pattern can be determined for each kind of magnetic card 1. The pattern storage section 45 can change stored signal patterns as required and store a plurality of signal patterns so as to deal with a plurality of magnetic cards 1.

Figure 3:
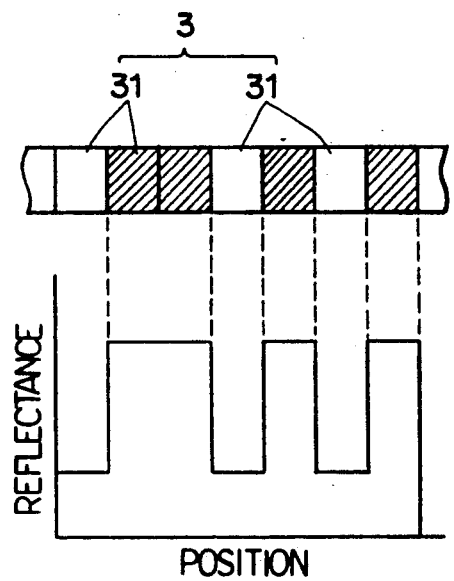
FIGS. 3(a), 3(b) and 3(c) are charts which illustrate hole punch sections of FIG. 1 and the results of the detection by the punched hole detection apparatus of FIG. 2.
Figure 3:
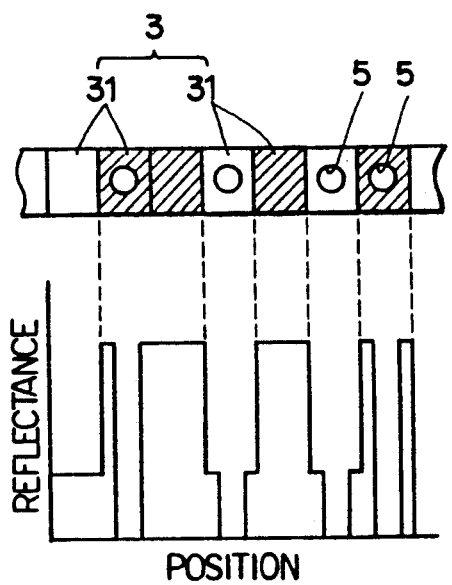
Figure 3:
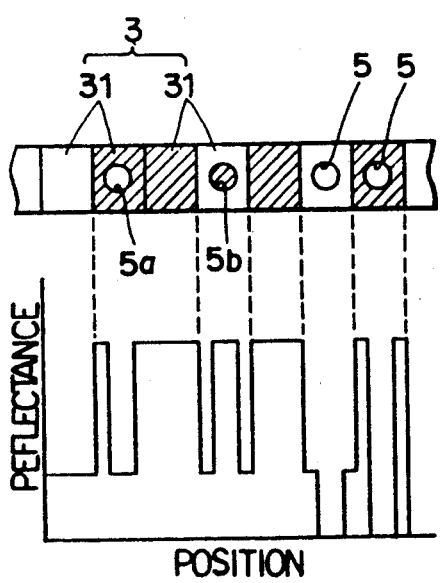

Next, the operation and function of detecting the punched holes 5 by the punched hole detecting apparatus 4 will be explained. As shown in FIGS. 3(a), 3(b) and 3(c), inks which have different reflectance to ultra-red rays are applied to the hole punch section 3 (in the figures, the shaded portions indicate the small segments 31 where inks of high reflectance to ultra-red rays has been applied).

First, when the magnetic card 1 is loaded into the punched hole detection apparatus 4, ultra-red rays are emitted from the LED 41 and shot onto the hole punch section 3. The light-receiving sensor 42 receives ultra-red rays reflected by the hole punch section 3 and sends light reception signals to the reflectance detecting section 43. The reflectance detecting section 43 calculates ultra-red rays reflectance on the basis of the light reception signals and outputs output signals shown in the figures, the magnitude of which is proportional to the reflectance. No reflection of ultra-red rays occurs in the sections of the punched holes 5. As shown in FIG. 3(b), signals are not output.

The comparison section 44 compares these detected signals with a normal signal pattern which has previously been stored in the pattern storage section 45. The compared result enables the detection of the fact of whether the punched holes 5 are normal.

When the magnetic card 1 is forged, the forgery can be identified by the fact that normal signal patterns cannot be restored because of the difference in ultra-red rays reflectance unless scraps are used on which the same ink as the ink applied to the small segment 31 of each of the punched holes 5, even if the holes 5 are filled up by using the same material as the magnetic card 1, for example, scraps produced when the punched holes 5 are punched. For instance, when n punched holes 5 are filled up, the probability that the ink of the small segments 31 will match the ink applied to the scraps is $\frac{1}{2}$ in each of the punched holes 5. Accordingly, the probability that a normal signal pattern can be restored becomes $\frac{1}{2}^n$, which is quite small.

FIG. 3(c) shows an example in which the first and second punched holes 5a and 5b from the left of the punched holes 5 of FIG. 3(b), are each filled up by scraps on which ink which is different from that of the small segments thereof is applied.

As shown, detected signals indicate that reflectance is considerably lower than that of the small segment 31 surrounding the punched hole 5a, whereas at the punched hole 5b, reflectance is considerably higher than that of the surrounding small segment 31. The comparison of this detected signal with a normal signal pattern by the comparison section 44 enables the detection of the fact that the punched holes 5a and 5b are filled up by foreign matter. The punched hole detection apparatus 4 may be used by itself, or when it is incorporated into a reading apparatus for the magnetic card 1.

Although in this embodiment inks having different reflectances of ultra-red rays are applied to the small segments 31 of the hole punch section 3 and the difference in the ultra-red ray reflectances is detected, other means using two kinds of ink having different optical characteristics may be used. For example, ultraviolet-ray emitting ink (fluorescent ink or the like) which emits light by being shot with ultraviolet rays may be used for one of the inks applied to the small segments 31, and a light source for shooting ultraviolet rays to the punched hole detection apparatus 4 and a light-receiving sensor for detecting the light emission of the ultraviolet rays emitting ink may be provided so that the presence or absence of light emission can be detected by shooting ultraviolet rays to the hole punch section 3.

Furthermore, two kinds of ink which cause metamerism may be applied to the small segments 31, and a color filter may be provided in the light source or the light-receiving section of the punched hole detection apparatus 4, so that the difference in the spectroscopic distribution of each of the inks can be detected.

In addition, thermosensible color-producing ink which produces color at a predetermined temperature may be used as one of the inks applied to the small segments 31, and a heater may be provided in the punched hole detection apparatus 4, so that the presence or absence of produced color can be detected by heating the hole punch section to the predetermined temperature.

I claim:

1. A system for detecting punched holes of magnetic cards, comprising:

magnetic cards in which data is recorded magnetically and holes are punched to indicate incidence of use; and a punched hole detection apparatus for detecting punched holes in each of the magnetic cards, wherein each of the magnetic cards has a hole punch section in the shape of a strip, wherein said punched hole section has a plurality of small segments in a row which are arranged parallel to the length of the card, and two kinds of ink having different optical characteristics are applied to the small segments according to prescribed rules, and wherein the punched hole detection apparatus comprises a light source for shooting rays of light used to distinguish the two kinds of ink onto the punched hole section; a light-receiving section for receiving rays of light reflected by the hole punch section of the magnetic card and for outputting a light reception signal; a pattern storage section for storing predefined signal patterns for normal magnetic cards; and a comparison section for comparing the light reception signal from the light-receiving section with normal signal patterns stored by the pattern storage section.

2. A system for detecting punched holes of magnetic cards according to claim 1, wherein the two kinds of ink which are applied to the small segments in the hole punch section have different ultra-red ray reflectances, wherein the light source of the punched hole detection apparatus is a LED which emits ultra-red rays, and wherein the light-receiving section of said apparatus is a light-receiving sensor which detects ultra-red rays.

3. A system for detecting punched holes of magnetic cards according to claim 1, wherein one of the two kinds of ink applied to the small segments provided in the hole punch section of the magnetic card is an ultraviolet-ray emitting ink which emits light when ultraviolet rays are shot thereto, wherein the light source of the punched hole detection apparatus is a light source which emits ultraviolet rays, and wherein the light-receiving section of said apparatus is a light-receiving sensor which detects the light emission of the ultraviolet-ray emitting ink.

4. A system for detecting punched holes of magnetic cards according to claim 1, wherein the two kinds of ink which are applied to the small segments provided in the hole punch section of the magnetic card cause metamerism, and wherein a color filter for identifying the metamerism is disposed in the light source or the light-receiving section of the punched hole detection apparatus.

5. A system for detecting punched holes of magnetic cards according to claim 1, wherein one of the two kinds of ink applied to the small segments provided in the hole punch section of the magnetic card is a thermo-sensitive color-producing ink which produces color at a predetermined temperature, and wherein a heater for heating the punched hole detecting section to the predetermined temperature is disposed in the punched hole detection apparatus.

* * * * *